United States Patent Office 3,410,856
Patented Nov. 12, 1968

3,410,856
INTERMEDIATES AND PROCESS FOR
PREPARING VITAMIN B₆
Elbert E. Harris, Westfield, and Peter I. Pollak, Scotch
Plains, N.J., assignors to Merck & Co., Inc., Rahway,
N.J., a corporation of New Jersey
No Drawing. Filed Oct. 21, 1965, Ser. No. 500,332
10 Claims. (Cl. 260—270)

ABSTRACT OF THE DISCLOSURE 4-methyl-5-cyano-(or hydrocarbonoxy)oxazole is reacted with a cyclic ester derivative of 2-butene-1,4-diol to produce novel cyclic pyridoxol intermediates which upon hydrolysis yield pyridoxol (vitamin B₆).

---

This invention relates to a method for making pyridine compounds. More particularly, it is concerned with a process for the preparation of new cyclic pyridoxol derivatives and also with a process for converting these cyclic pyridoxol derivatives to pyridoxine (pyridoxol).

The preparation of pyridoxine by the reaction of oxazoles with derivatives of 2-butene-1,4-diol to produce pyridine intermediates and the subsequent conversion of these intermediates to pyridoxol by several methods has been described in the art. Generally, however, these procedures involve a multiplicity of steps and many of them encounter difficulty in converting the pyridine intermediates to pyridoxine itself. Thus, other processes commercially and economically suitable for the preparation of vitamin B₆ have been sought.

It is an object of this invention to provide an improved process for the preparation of vitamin B₆. It is a further object of this invention to provide new cyclic pyridoxol derivatives which can be easily and conveniently converted to vitamin B₆ by a simple hydrolysis. It is also an object of this invention to provide a process for the preparation of the new cyclic pyridoxol derivatives.

Other objects will become apparent from the detailed description of the invention hereinafter provided.

In accordance with the present invention it is now found that vitamin B₆ can be readily and conveniently produced by reacting a 4-methyl-5-cyanooxazole or a 4-methyl-5-hydrocarbonoxyoxazole with cyclic ester derivatives of 2-butene-1,4-diol to produce new cyclic pyridoxol intermediates and then hydrolyzing these cyclic pyridoxol intermediates to form pyridoxine.

The reaction for the preparation of the cyclic pyridoxol derivatives and subsequent conversion to pyridoxine can be shown as follows:

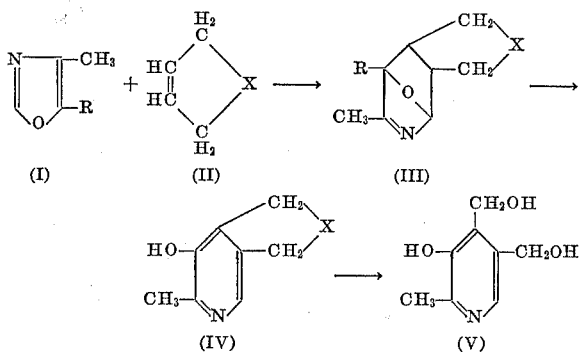

wherein R represents a cyano or a hydrocarbonoxy group and X represents a radical derived from an inorganic polybasic acid or a derivative thereof.

Thus, in accordance with the foregoing equations the oxazole is reacted with a cyclic ester derivative of 2-butene-1,4-diol to produce the corresponding 3,4-cyclic pyridoxol derivatives and these intermediate derivatives then hydrolyzed to produce pyridoxine. In the foregoing described reaction the substituent R of the oxazole moiety shown in Formula I represents a cyano group or a hydrocarbonoxy group. The process of the invention can be carried out with a 4-methyl-5-cyanooxazole or with various 4-methyl-5-hydrocarbonoxy oxazoles although generally it is preferred to use the 5-hydrocarbonoxy oxazoles having a hydrocarbon group containing from 1 to 10 carbon atoms. Since such compounds are readily prepared and produce high yields of the cyclic pyridoxol derivatives, those oxazoles wherein the hydrocarbon substituent is a lower alkyl group of from 1 to 10 carbon atoms, such as methyl, ethyl, isopropyl, butyl, isobutyl, amyl and octyl, a heterocyclic alkyl such as tetrahydrofurfuryl and an aralkyl group such as benzyl and phenyl ethyl and an aryl group such as phenyl, tolyl and the like, represent preferred 4-methyl-5-hydrocarbonoxyoxazoles which can be used in the process of the present invention.

The cyclic esters of 2-butene-1,4-diol shown by Formula II above which are reacted with the various oxazoles to produce the cyclic pyridoxol compounds can be those wherein X represents a radical derived from a polybasic inorganic acid or a radical derived from a derivative of polybasic inorganic acid. Thus, the polybasic inorganic acids from which the definition of X can be derived are those inorganic acids as sulfuric acid, carbonic acid, sulfurous acid, boric acids, phosphoric acid, orthosilicic acid, boronic acids, aluminic acid and the like. Also radicals derived from derivatives of polybasic inorganic acids can form the definition of X in Formula II above and these derivatives of polybasic inorganic acids are preferably lower alkyl or phenyl derivatives of the said acids such as, phenyl boronic acids, alkyl boric acids, alkyl orthosilicic acids or the like. Thus, for example, the cyclic phenyl boronic acid derivative of 2-butene-1,4-diol, namely, 2-butene-1,4-diol phenyl boronate would necessitate a definition of X in Formula II above which would be a radical derived from a phenyl derivative of the inorganic boronic acid. Examples of other preferred cyclic esters of 2-butene-1,4-diol which are shown in Formula II above in which X represents a radical derived from a polybasic inorganic acid or an alkyl or phenyl derivative of a polybasic inorganic acid, are 2-butene-1,4-diol cyclic carbonate, 2-butene-1,4-diol cyclic sulfite, 2-butene-1,4-diol cyclic sulfate, 2-butene-1,4-diol cyclic phosphate, 2-butene-1,4-diol cyclic alkyl borate, 2-butene-1,4-diol cyclic alkylboronate, 2-butene-1,4-diol cyclic phenylboronate, 2-butene-1,4-diol cyclic dialkyl silicate, bis(2-butene-1,4-diol)cyclic silicate and 2-butene-1,4-diol cyclic aluminum alkoxide.

The reaction between the oxazole and the cyclic ester derivatives of 2-butene-1,4-diol is effected by intimately contacting a mixture of the reactants for sufficient time to complete the reaction. The reaction between the cyclic ester derivatives of 2-butene-1,4-diol and the oxazole can be carried out at temperatures from about 80° C. to approximately 250° C. although it is preferred to carry out the reaction at temperatures from about 100° C. to approximately 200° C. The formation of the cyclic pyridoxol compounds can be carried out in a suitable solvent for the reactants such as methanol, benzene, and the like, although the presence of such a solvent is not essential in carrying out the process of this invention.

The cyclic pyridoxol derivatives obtained according to this process can be easily converted to pyridoxine (vitamin B₆) by a simple acid hydrolysis. Thus, the cyclic pyridoxol compounds can be hydrolyzed in the presence of aqueous inorganic acids such as for example, hydrochloric acid, sulfuric acid and the like to produce pyridoxine. It is preferable to hydrolyze the reaction mixture of the cyclic pyridoxol compounds without isolating the cyclic pyridoxol derivatives themselves. Thus, it is preferable to hydrolyze directly the reaction mixture of the cyclic pyridoxol compound if a solvent had been used initially or to dissolve the reaction product of the oxazole and the cyclic ester of 2-butene-1,4-diol in an appropriate aqueous acid solution to effect the hydrolysis if no solvent was used initially. However, if desired the cyclic pyridoxol compounds can be isolated at this point by procedures known in the art such as for example, by chromatography. If the cyclic pyridoxol derivatives are isolated they can be hydrolyzed as described above to produce pyridoxine.

In a preferred embodiment of this invention the hydrolysis can be carried out in an aqueous hydrochloric acid solution in order to produce pyridoxine hydrochloride directly.

In preparing the cyclic pyridoxol compounds in accordance with the present invention, the initial product formed by the reaction of the oxazole and the cyclic ester derivative of 2-butene-1,4-diol under certain conditions is apparently an adduct which can be represented by the formula:

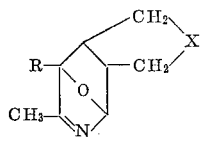

wherein X and R are as defined above. This adduct which is also shown as compound (III) in the equation diagram appears to be formed as an initial product when the oxazole and the cyclic ester derivative of 2-butene-1,4-diol are reacted together and is cleaved to form the desired cyclic pyridoxol derivative when the reaction product is treated with an acid. This cleavage also occurs to some extent in the condensation medium itself, especially at the higher temperatures such as about 100° C. or above.

It should, of course, be understood that the explanation of the course of the reaction involving the intermediate adduct shown above is based on our present knowledge of the reaction and does not exclude the possibility that subsequent experimental data will explain that the structure of the adduct is in fact incorrect. Accordingly, we do not wish to be bound by these theoretical considerations. These explanations are presented principally as a means of providing a better understanding of our invention.

The following examples illustrate various methods of producing the new cyclic pyridoxol derivatives described in this invention. They also show the preparation of pyridoxine from these cyclic pyridoxol derivatives. Examples are also included which show the preparation of cyclic ester derivatives of 2-butene-1,4-diol which are used as starting materials in the processes of this invention. It should be understood of course that these examples represent illustrations of the invention and should not be deemed as limitations thereof.

EXAMPLE 1

Preparation of pyridoxol cyclic 3,4-carbonate and then pyridoxine using 4-methyl-5-ethoxyoxazole A mixture of 2.3 g. (0.02 mole) of 2-butene-1,4-diol cyclic carbonate prepared as described below and 0.5 g. (.004 mole) of 4-methyl-5-ethoxyoxazole is heated in a closed tube in an oil bath at 140° C. for four hours. The resulting solution containing pyridoxol cyclic 3,4-carbonate is cooled to room temperature. The mixture containing pyridoxol cyclic 3,4-carbonate is then taken up in 40 ml. of 2 N aqueous hydrochloric acid, warmed on the steam bath for 30 minutes, and the solvent and excess butenediol stripped off under reduced pressure. The residue is recrystallized from a small amount of water to yield vitamin $B_6$ hydrochloride, which is identical with an authentic sample in melting point, mixed melting point, and U.V. and I.R. spectral comparisons.

Preparation of 2-butene-1,4-diol cyclic carbonate

The cyclic carbonate ester is prepared by the anhydrous potassium carbonate catalyzed reaction of 2-butene-1,4-diol with diethyl carbonate. Ethanol is distilled out of the boiling mixture of the reagents and the residue is cooled, extracted into hot acetone, and recrystallized from acetone to yield 2-butene-1,4-diol cyclic carbonate.

The process of this example can be similarly carried out using other oxazoles in place of 4-methyl-5-ethoxyoxazole such as other 4-methyl-5-loweralkoxyoxazoles, for example, the 5-isopropoxyoxazole and the 5-amyloxyoxazole, or other oxazoles such as 4-methyl-5-phenoxyoxazole, 4-methyl-5-benzyloxyoxazole, 4-methyl-5-phenylethyloxyoxazole, 4-methyl - 5 - phenylpropyloxyoxazole, 4-methyl-5-tolyloxyoxazole and 4-methyl - 5 - tetrahydrofurfuryloxyoxazole to produce the corresponding pyridoxol intermediate and then vitamin $B_6$.

EXAMPLE 2

Preparation of pyridoxol cyclic 3,4-carbonate and pyridoxine using 4-methyl-5-cyanooxazole A mixture of 2.3 g. (0.02 mole) of 2-butene-1,4-diol cyclic carbonate prepared as described in Example 1 and 0.43 g. (.004 mole) of 4-methyl-5-cyanooxazole is heated in a closed tube in an oil bath at 150° C. for 12 hours. After cooling, the resulting solution containing pyridoxol cyclic 3,4-carbonate is dissolved in 50 ml. of 2 N hydrochloric acid, heated to reflux for one hour and concentrated at low pressure and at a bath temperature of 130° C. until distillation ceases. The non-volatile residue is recrystallized from a small amount of water to yield vitamin $B_6$ hydrochloride which is identified as in Example 1.

EXAMPLE 3

Preparation of pyridoxol cyclic 3,4-sulfite and then pyridoxine hydrochloride

A mixture of 6.7 g. (.05 mole) of 2-butene-1,4-diol cyclic sulfite and 1.27 g. (.01 mole) of 4-methyl-5-ethoxyoxazole is sealed in a glass Carius tube and heated in an oil bath at 125° C. for 2 hours. The tube is then cooled and opened and the resulting mixture containing pyridoxol cyclic 3,4-sulfite transferred to a small flask and stripped of unreacted cyclic sulfite ester under a reduced pressure of 5 mm. Hg. The residue is treated with 25 ml. of 6 N hydrochloric acid, heated under reflux for 1 hour, the volatiles removed under reduced pressure and the dry residue recrystallized from a minimum amount of water to yield vitamin $B_6$ hydrochloride, identified by melting point, mixed melting point and U.V. and I.R. spectral comparisons.

The process of this example can be similarly carried out using other oxazoles in place of 4-methyl-5-ethoxyoxazole such as the 4-methyl-5-cyanooxazole or other 4-methyl-5-loweralkoxyoxazoles for example, 5-iso-propoxyoxazole or 5-amyloxyoxazole or other oxazoles such as 4-methyl-5-phenoxyoxazole, 4-methyl-5-benzyloxyoxazole, 4-methyl-5-phenylethyloxyoxazole, 4-methyl-5-phenylpropyloxyoxazole, 4-methyl-5-tolyloxyoxazole and 4-methyl-5-tetrahydrofurfuryloxyoxazole, to produce the corresponding pyridoxol intermediate and then vitamin $B_6$.

EXAMPLE 4

Preparation of pyridoxol cyclic 3,4-sulfate and then pyridoxine hydrochloride

A mixture of 3.6 g. (.024 mole) of 2-butene-1,4-diol cyclic sulfate prepared as described below and 0.51 g. (.004 mole) of 4-methyl-5-ethoxyoxazole is sealed in a glass tube and heated in an oil bath at 125° C. for twelve hours. The mixture is cooled and the tube opened. The resulting solution containing pyridoxol cyclic 3,4-sulfate is treated with 20 ml. of 4 M methanolic hydrogen chloride, heated on the steam bath for 15 minutes, then cooled to 0° C. and filtered. The solids are extracted with 2 x 20 ml. of hot methanol to remove unreacted butenediol sulfate ester. The residue is dissolved in 5 ml. of 0.1 N hydrochloric acid, heated in a sealed tube at 150° C. for three hours and cooled. The contents of the tube are concentrated to dryness in vacuo and the residue recrystallized from a minimum of 0.1 N hydrochloric acid to yield crystalline vitamin $B_6$ hydrochloride, identified by melting point and spectral comparisons with an authentic sample.

Preparation of 2-butene-1,4-diol cyclic sulfate 2-butene-1,4-diol cyclic sulfate is prepared by slowly adding 1,4-dichloro-2-butene to a well-stirred refluxing suspension of silver sulfate in xylene. After the reaction is complete, the solvent is stripped off under reduced pressure and the product is extracted into hot methanol. The methanol is the nconcentrated to a low volume at which time the product crystallizes out of solution.

EXAMPLE 5

Preparation of pyridoxol cyclic 3,4-phosphate and then pyridoxine hydrochloride

A mixture of 3.0 g. (.020 mole) of 2-butene-1,4-diol cyclic phosphate prepared as described below and 0.51 g. (.004 mole) of 4-methyl-5-ethoxyoxazole in a sealed glass tube is heated at 150° C. for 5 hours. After cooling, the tube is opened and the resulting mixture containing pyridoxol cyclic 3,4-phosphate is dissolved in 25 ml. of 2 N hydrochloric acid and heated under reflux for two hours. After cooling, the solution is neutralized to pH 7 with 20% sodium hydroxide solution and the phosphates are precipitated by the addition of solid calcium chloride. After filtration, the liquors are acidified to pH 1 with concentrated hydrochloric acid, and the aqueous solution concentrated under reduced pressure to a small volume. Upon cooling to 0° C., crude vitamin $B_6$ hydrochloride crystallizes out, is filtered off and recrystallized from a minimum of hot water to yield pure vitamin $B_6$ hydrochloride, identified by melting point and spectral comparisons in the usual manner as described in Example 1.

Preparation of 2-butene-1,4-diol cyclic phosphate

The cyclic phosphate ester is prepared by slowly adding a solution of phosphorous oxychloride in dry pyridine to a solution of 2-butene-1,4-diol in dry pyridine at 0° C. The mixture is allowed to warm to room temperature overnight, then the precipitated pyridine hydrochloride is filtered off. The filtrate is poured into 200 ml. of ice water, the bulk of the pyridine is distilled off under vacuum and the pH of the residue is adjusted to 10 with an aqueous barium hydroxide solution. The precipitated barium phosphate is filtered off and any residual pyridine is distilled off under vacuum. The aqueous solution is then passed through a column of Dowex-50 ion exchange on the hydrogen cycle. The eluate is concentrated under vacuum to a solid and recrystallized from a minimum amount of water to yield 2-butene-1,4-diol cyclic phosphate.

EXAMPLE 6

Preparation of pyridoxol cyclic 3,4-butyl borate and then pyridoxine hydrochloride A mixture of 4.2 g. (.025 mole) of 2-butene-1,4-diol cyclic butyl borate prepared as described below and 0.64 g. (.005 mole) of 4-methyl-5-ethoxyoxazole is sealed in a glass tube and heated in an oil bath at 150° C. for 4 hours. The tube is cooled and the resulting solution containing pyridoxol cyclic 3,4-butyl borate is dissolved in 200 ml. of 7 N methanolic hydrogen chloride. Trimethylborate and methanol are distilled out at atmospheric pressure. When the temperature in the flask begins to rise sharply the pressure is reduced to 5 mm. and the butanol and unreacted 2-butene-1,4-diol are distilled out, leaving a volatile-free residue. Recrystallization of this residue from water yields vitamin $B_6$ hydrochloride, characterized as in Example 1.

Preparation of 2-butene-1,4-diol cyclic butyl borate

One mole of boron trichloride is slowly added to a mixture of one mole of 2-butene-1,4-diol and four volumes of hexane which is maintained at a temperature of −10° C. with a Dry-Ice-acetone bath. The volatiles are distilled off under reduced pressure and the resulting chloroborate is distilled at 0.3 mm. Hg pressure. The distillate is taken up in hexane, one mole of n-butanol added and the mixture allowed to stand for three hours at room temperature. The 2-butene-1,4-diol cyclic butyl borate is isolated by distillation at 1 mm. Hg pressure.

Following the procedure above but using an equivalent amount of ethanol, propanol, n-hexanol or n-pentanol, in place of n-butanol there is produced 2-butene-1,4-diol cyclic ethyl, propyl, hexyl or pentyl borate.

The process of this example can be similarly carried out using other oxazoles in place of 4-methyl-5-ethoxyoxazole such as the 4-methyl-5-cyanooxazole or other 4-methyl-5-lower alkoxyoxazoles for example, the 5-isopropoxyoxazole or the 5-amyloxyoxazole or other oxazoles such as 4 - methyl - 5 - phenoxyoxazole, 4-methyl-5-benzyloxyoxazole, 4 - methyl - 5-phenylethyloxyoxazole, 4-methyl-5-phenylpropyloxy-oxazole, 4-methyl-5-tolyloxyoxazole and 4-methyl-5-tetrahydrofurfuryloxyoxazole, to produce the corresponding pyridoxol intermediate and then vitamin $B_6$.

Similarly, the process of this example can be carried out by using other cyclic alkyl derivatives of 2-butene-1,4-diol in place of 2-butene-1,4-diol cyclic butyl borate such as 2-butene-1,4-diol cyclic ethyl borate, 2-butene-1,4-diol cyclic propyl borate and 2-butene-1,4-diol cyclic pentyl borate to produce the pyridoxol intermediate and then vitamin $B_6$.

EXAMPLE 7

Preparation of pyridoxol cyclic 3,4-phenyl boronate and then pyridoxine hydrochloride 5.23 g. (.03 mole) of 2-butene-1,4-diol cyclic phenylboronate prepared as described below is sealed in a glass tube along with 0.64 g. of 4-methyl-5-ethoxyoxazole. The mixture is heated in an oil bath at 150° C. for 4 hours. The resulting mixture containing pyridoxol cyclic 3,4-phenyl boronate is cooled and the tube opened. The contents of the tube are then transferred to a small flask and excess phenyl boronic ester is distilled off at 0.5 mm. Hg pressure. The residue is then combined with 50 ml. of 0.1 N hydrochloric acid and heated in a sealed vessel at 155° C. for 4 hours. The mixture is cooled and the solvent distilled out under reduced pressure until a residue is left. The residue is taken up in 200 ml. of 7 N methanolic hydrogen chloride. The resulting product is isolated from the solution and identified as vitamin $B_6$ hydrochloride, as described in Example 1.

Preparation of 2-butene-1,4-diol cyclic phenylboronate

A mixture of 26.6 g. (0.3 mole) of 2-butene-1,4- diol and 31.2 g. of phenyl boronic acid in the form of its trimeric anhydride is refluxed for four hours in 150 ml. of dry acetone. The acetone is then distilled off and the residue vacuum-fractionated at 1 mm. Hg pressure to obtain the desired product.

Similarly, cyclic boronic esters of butenediol such as 2-butene-1,4-diol cyclic butyl boronate or 2-butene-1,4-diol cyclic ethyl boronate can be prepared by using the above procedure but substituting n-butyl boronic acid or ethyl boronic acid in place of phenyl boronic acid.

The process of this example can be similarly carried out using other oxazoles in place of 4-methyl-5-ethoxyoxazole such as the 4-methyl-5-cyanooxazole or other 4-methyl-5-lower-alkoxyoxazoles for example, the 5-isopropoxyoxazole or the 5-amyloxyoxazole or other oxazoles such as 4 - methyl - 5 - phenoxyoxazole, 4-methyl-5-benzyloxyoxazole, 4 - methyl - 5-phenylethyloxyoxazole, 4-methyl-5-phenylpropyloxyoxazole, 4-methyl-5-tolyloxyoxazole and 4-methyl-5-tetrahydrofurfuryloxyoxazole, to produce the corresponding pyridoxol intermediate and then vitamin $B_6$.

Similarly, the process of this example can be carried out using other cyclic alkyl boronates in place of 2-butene-1,4-diol cyclic phenyl boronate such as 2-butene-1,4-diol cyclic ethyl boronate or 2-butene-1,4-diol cyclic butyl boronate to produce the pyridoxol intermediate and then vitamin $B_6$.

EXAMPLE 8

Preparation of pyridoxol cyclic diethyl 3,4-silicate and then pyridoxine

A mixture of 8.16 g. (.04 mole) of 2-butene-1,4-diol cyclic diethyl silicate prepared as described below and 1.27 g. (.01 mole) of 4-methyl-5-ethoxyoxazole is heated in a closed tube at 150° C. for 4 hours. After cooling the tube is opened and the resulting mixture containing pyridoxol cyclic diethyl 3,4-silicate is taken up in 100 ml. of 1 N ethanolic hydrogen chloride and refluxed for 1 hour. At this point 10 ml. of water is added dropwise to the warm, well-stirred solution. After slowly cooling to 25° C. the mixture is filtered, the solvents stripped off under reduced pressure and the residue extracted three times with 10 ml. portions of hot water. The combined extracts are concentrated to a small volume and cooled to 0° C. at which time vitamin $B_6$ hydrochloride crystallizes out of solution. The product is recrystallized from hot water to yield pure vitamin $B_6$ hydrochloride, characterized as in Example 1.

Following the procedure above but using 4.0 g. (0.02 mole) of bis(2 - butene - 1,4 - diol) - cyclic silicate whose preparation is also shown below in place of the 2-butene-1,4-diol cyclic diethyl silicate and 1.27 g. (0.01 mole) of 4 - methyl - 5 - ethoxyoxazole there is produced bis(pyridoxol)cyclic 3,4-silicate and then pyridoxine hydrochloride.

Preparation of 2-butene-1,4-diol cyclic diethyl silicate

An equimolecular mixture of tetraethyl orthosilicate and 2-butene-1,4-diol along with a catalytic amount of silicon tetrachloride is heated at 100° C. for four hours, during which time ethanol is fractionated out of the mixture. The residue is purified by vacuum distillation at a pressure of 30 mm. Hg. In a variation of the above, 2 moles of 2-butene-1,4-diol can be treated with 1 mole of silicon tetrachloride and one mole of tetraethyl orthosilicate to yield the bis(2-butene-1,4-diol)cyclic silicate.

Similarly there can be produced 2-butene-1,4-diol cyclic dialkyl silicates such as 2-butene-1,4-diol cyclic dibutyl silicate or 2-butene-1,4-diol cyclic dipropyl silicate by employing the procedure above but using tetrabutyl orthosilicate or tetrapropyl orthosilicate in place of tetraethyl orthosilicate.

The process of this example can be similarly carried out using other oxazoles in place of 4-methyl-5-ethoxyoxazole such as the 4-methyl-5-cyanooxazole or other 4-methyl-5-lower alkoxyoxazoles for example, the 5-isopropoxy-oxazole, or the 5-amyloxyoxazole or other oxazoles such as 4-methyl-5-phenoxyoxazole, 4-methyl-5-benzyloxyoxazole, 4-methyl-5-phenylethyloxyoxazole, 4-methyl-5-phenylpropyloxyoxazole, 4-methyl-5-tolyloxyoxazole and 4-methyl-5-tetrahydrofurfuryloxyazole, to produce the corresponding pyridoxol intermediate and then vitamin $B_6$.

Similarly, the process of the above example can be carried out using other 2-butene-1,4-diol cyclic dialkyl silicates in place of 2-butene-1,4-diol cyclic diethyl silicate such as 2-butene-1,4-diol cyclic dipropyl silicate, and 2-butene-1,4-diol cyclic dibutyl silicate to produce the cyclic pyridoxol derivative and then pyridoxine.

EXAMPLE 9

Preparation of pyridoxol cyclic aluminum isopropoxide and then pyridoxine

A mixture of 10.3 g. (.06 mole) of 2-butene-1,4-diol cyclic aluminum isopropoxide prepared as described below and 1.27 g. (.01 mole) of 4-methyl-5-ethoxyoxazole is sealed in a tube and heated in an oil bath at 140° C. for 6 hours. The tube is cooled and opened and the resulting mixture containing pyridoxol cyclic aluminum isopropoxide, carefully poured into 150 ml. of 2 N hydrochloric acid kept below 10° C. with external cooling. This solution is concentrated to dryness in vacuo and the residue taken up in 25 ml. of 2 N hydrochloric acid, cooled to 0° C., and saturated with dry hydrogen chloride gas. The precipitated aluminum chloride is filtered off and the filtrate again concentrated to dryness under vacuum. Recrystallization from water yields vitamin $B_6$ hydrochloride, identified as in Example 1.

Preparation of 2-butene-1,4-diol cyclic aluminum isopropoxide

An equimolecular mixture of aluminum isopropoxide and 2-butene-1,4-diol is heated at 120° C. with stirring and protection from moisture for approximately 3 hours. During this period 2 moles of isopropanol are fractionated out through a short column. The 2-butene-1,4-diol cyclic aluminum isopropoxide produced is then used directly in the reaction described above without further purification.

Similarly, using the above procedures but employing aluminum isobutoxide or aluminum isopentoxide in place of aluminum isopropoxide there is obtained 2-butene-1,4-diol cyclic aluminum isobutoxide or 2-butene-1,4-diol cyclic aluminum isopentoxide respectively.

The process of this example can be similarly carried out using other oxazoles in place of 4-methyl-5-ethoxyoxazole such as the 4-methyl-5-cyanooxazole or other 4-methyl-5-lower alkoxyoxazoles for example, the 5-isopropoxyoxazole or the 5-amyloxyoxazole or other oxazoles such as 4-methyl-5-phenoxyoxazole, 4-methyl-5-benzyloyoxazole, 4-methyl-5-phenylethyloxyoxazole, 4-methyl-5-phenylpropyloxyoxazole, 4 - methyl-5-tolyloxyoxazole and 4-methyl-5-tetrahydrofurfuryloxyazole, to produce the corresponding pyridoxol intermediate and then vitamin $B_6$.

Similarly, the process of the above example can be carried out using other 2-butene-1,4-diol cyclic aluminum alkoxides in place of 2-butene-1,4-diol cyclic aluminum isopropoxide such as 2-butene-1,4-diol cyclic aluminum butoxide or 2-butene-1,4-diol cyclic aluminum pentoxide to produce the cyclic pyridoxol derivative and then pyridoxine.

What is claimed is:

1. A process for the preparation of pyridoxine which comprises reacting at a temperature of about 80° C. to about 200° C. an oxazole of the formula:

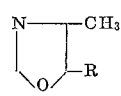

wherein R is a cyano or an oxy-radical of the formula OY wherein Y is an alkyl having from 1 to 10 carbon atoms, tetrahydrofurfuryl, benzyl, phenyl, ethyl, phenyl propyl, phenyl or tolyl with a compound of the formula:

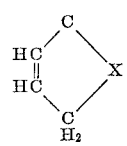

wherein X represents a phenyl boronate, a dialkyl silicate or an aluminum alkoxide radical and then hydrolyzing the resulting product to produce pyridoxine.

2. A process for the preparation of compounds of formula:

[structure: HO-, CH₃-, pyridine ring with CH₂-X and CH₂ substituents]

wherein X represents a phenyl boronate, a dialkyl silicate or an aluminum alkoxide radical which comprises reacting at a temperature of about 80° C. to about 200° C. an oxazole of the formula

[structure: oxazole with N, CH₃, O, R]

wherein R is a cyano or an oxy-radical or the formula OY wherein Y is an alkyl group having from 1 to 10 carbon atoms, tetrahydrofurfuryl, benzyl, phenyl ethyl, phenyl propyl, phenyl or tolyl, with a compound of the formula

[structure: HC=CH with CH₂-X-CH₂ cyclic]

wherein X is as described above.

3. A process for the preparation of pyridoxine which comprises hydrolyzing a compound of the formula

[structure: HO-, CH₃-, pyridine ring with CH₂-X and CH₂]

wherein X represents a phenyl boronate, a dialkyl silicate or an aluminum alkoxide radical

4. A process for the preparation of pyridoxine which comprises reacting at a temperature of about 80° C. to about 200° C. 4-methyl-5-ethoxyoxazole with 2-butene-1,4-diol cyclic phenyl boronate to produce pyridoxol cyclic 3,4-phenyl boronate and then hydrolyzing the pyridoxol cyclic 3,4-phenyl boronate.

5. A process for the preparation of pyridoxine which comprises reacting at a temperature of about 80° C. to about 200° C. 4-methyl-5-ethoxyoxazole with 2-butene-1,4-diol cyclic diethyl silicate to produce pyridoxol cyclic diethyl 3,4-silicate and then hydrolyzing the pyridoxol cyclic diethyl 3,4-silicate.

6. A process for the preparation of pyridoxine which comprises reacting at a temperature of about 80° C. to about 200° C. 4-methyl-5-ethoxyoxazole with 2-butene-1,4-diol cyclic aluminum isopropoxide to produce pyridoxol cyclic aluminum isopropoxide and then hydrolyzing the pyridoxol cyclic aluminum isopropoxide so produced.

7. Compounds of the formula:

[structure: HO-, CH₃-, pyridine ring with CH₂-X and CH₂]

wherein X represents a phenyl boronate, a dialkyl silicate or an aluminum alkoxide radical.

8. Pyridoxol cyclic 3,4-phenyl boronate.
9. Pyridoxol cyclic diethyl 3,4-silicate.
10. Pyridoxol cyclic aluminum isopropoxide.

References Cited

UNITED STATES PATENTS

| | | | |
|---|---|---|---|
| 3,173,934 | 3/1965 | Davison | 260—270 X |
| 3,227,722 | 1/1966 | Pfister et al. | 260—297 X |
| 3,250,778 | 5/1966 | Kimel | 260—297 |
| 3,285,924 | 11/1966 | Osbond | 260—297 X |
| 3,296,275 | 1/1967 | Schaeren | 260—297 |

NICHOLAS S. RIZZO, *Primary Examiner.*

DONALD G. DAUS, *Assistant Examiner.*